United States Patent
Gates et al.

(10) Patent No.: US 9,842,219 B1
(45) Date of Patent: Dec. 12, 2017

(54) SYSTEMS AND METHODS FOR CURATING FILE CLUSTERS FOR SECURITY ANALYSES

(71) Applicant: Symantec Corporation, Mountain View, CA (US)

(72) Inventors: Christopher Gates, Culver City, CA (US); Kevin Roundy, El Segundo, CA (US); Petrus Johannes Viljoen, Manhattan Beach, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 14/733,983

(22) Filed: Jun. 9, 2015

(51) Int. Cl.
*G06F 21/62* (2013.01)
*G06F 21/50* (2013.01)

(52) U.S. Cl.
CPC .......... *G06F 21/6209* (2013.01); *G06F 21/50* (2013.01); *G06F 2221/031* (2013.01); *G06F 2221/2107* (2013.01)

(58) Field of Classification Search
CPC ...... G06F 21/55; G06F 21/56; G06F 21/6209; H04L 63/1441
See application file for complete search history.

(56) References Cited

U.S. PATENT DOCUMENTS

| | | | |
|---|---|---|---|
| 8,190,611 B1 | 5/2012 | Nachenberg et al. | |
| 8,291,497 B1 * | 10/2012 | Griffin | G06F 21/564 709/224 |
| 8,341,745 B1 | 12/2012 | Chau et al. | |
| 2006/0218642 A1 | 9/2006 | Kuppusamy et al. | |
| 2009/0083852 A1 | 3/2009 | Kuo et al. | |
| 2011/0047594 A1 | 2/2011 | Mahaffey et al. | |
| 2012/0090025 A1 | 4/2012 | Milner et al. | |
| 2012/0323829 A1 * | 12/2012 | Stokes | G06F 21/563 706/12 |

OTHER PUBLICATIONS

Acar Tamersoy, et al; Systems and Methods for Detecting Malware Using File Clustering; U.S. Appl. No. 14/273,503, filed May 8, 2014.

(Continued)

*Primary Examiner* — Dao Ho
(74) *Attorney, Agent, or Firm* — FisherBroyles LLP

(57) ABSTRACT

The disclosed computer-implemented method for curating file clusters for security analyzes may include (1) identifying a suspicious file that exists on at least one computing system within a computing community, (2) clustering a set of files that includes the suspicious file into a file cluster based at least in part on at least one characteristic shared by the set of files, (3) prioritizing at least one file included in the file cluster based at least in part on a contextual value of the file relative to the file cluster, (4) providing, for presentation to a security analyst, a graphical representation of the file cluster that highlights the prioritized file relative to the file cluster, and then (5) performing at least one security action on the suspicious file based at least in part on feedback received from the security analyst. Various other methods, systems, and computer-readable media are also disclosed.

12 Claims, 6 Drawing Sheets

(56) References Cited

OTHER PUBLICATIONS

Chau, Duen H., et al., "Polonium: Tera-Scale Graph Mining and Inference for Malware Detection", http://www.cs.cmu.edu/~dchau/polonium_sdm2011.pdf, as accessed Mar. 18, 2014, (2011).

Denis, Frank, "Discovering Malicious Domains Using Co-Occurrences", http://labs.opendns.com/2013/07/24/co-occurrences/?referred=1, as accessed Mar. 18, 2014, OpenDNS Security Labs Blog, (Jul. 24, 2013).

"McAfee Global Threat Intelligence; Comprehensive, cloud-based threat intelligence", http://www.mcafee.com/us/resources/datasheets/ds-global-threat-intelligence.pdf, as accessed Mar. 18, 2014, Data Sheet, McAfee, Inc., (2010).

"McAfee GTI Reputation & Categorization Services", http://www.mcafee.com/us/threat-center/technology/gti-reputation-technologies.aspx, as accessed Mar. 18, 2014, McAfee, Inc., (2003).

"McAfee Global Threat Intelligence File Reputation Service; Best Practices Guide for McAfee VirusScan® Enterprise Software", https://kc.mcafee.com/resources/sites/MCAFEE/content/live/PRODUCT_DOCUMENTATION/24000/PD24043/en_US/48302wp_gti-best-practices_0812_fnl.pdf, as accessed Mar. 18, 2014, McAfee, Inc., (2012).

"FAQs for Global Threat Intelligence File Reputation", https://kc.mcafee.com/corporate/index?pages=content&id=KB53735, as accessed Mar. 18, 2014, Knowledge Center, McAfee, Inc., (2003).

Jeffrey S. Wilhelm, et al; Systems and Methods for Anticipating File-Security Queries; U.S. Appl. No. 14/570,518, filed Dec. 15, 2014.

Kevin Roundy, et al; Systems and Methods for Whitelisting File Clusters in Connection with Trusted Software Packages; U.S. Appl. No. 14/737,528, filed Jun. 12, 2015.

Christopher Gates, et al; Systems and Methods for File Classification; U.S. Appl. No. 14/751,178, filed Jun. 26, 2015.

Karampatziakis, Nikos et al., "Using File Relationships in Malware Classification", http://link.springer.com/chapter/10.1007/978-3-642-37300-8_1, as accessed May 26, 2015, Using File Relationships in Malware Classification, Detection of Intrusions and Malware, and Vulnerability Assessment Lecture Notes in Computer Science, 9th International Conference, DIMVA 2012, vol. 7591, Springer Berlin Heidelberg, Crete, Greece, (Jul. 26-27, 2012).

Ye, Yanfang et al., "Combining File Content and File Relations for Cloud Based Malware Detection", http://users.cis.fiu.edu/~taoli/pub/p222-malware.pdf, as accessed May 26, 2015, KDD'11, ACM, San Diego, California, (Aug. 21-24, 2011).

"Malheur", http://www.mlsec.org/malheur/, as accessed May 26, 2015, (Jan. 4, 2010).

"Application Whitelisting", https://www.bit9.com/solutions/application-whitelisting/, as accessed Mar. 30, 2015, Bit9, (Apr. 29, 2013).

"McAfee Application Control", www.mcafee.com/us/products/application-control.aspx, as accessed Mar. 30, 2015, (Dec. 12, 2010).

Michael Hart, et al.; A System to identify machines infected by Malware Applying Linguistic Analysis; U.S. Appl. No. 14/226,626, filed Mar. 26, 2014.

* cited by examiner

SYSTEMS AND METHODS FOR CURATING FILE CLUSTERS FOR SECURITY ANALYSES

BACKGROUND

Computer security systems often monitor computing devices for potential security threats. For example, a computing device may implement a traditional computer security system to protect against potential security threats. In this example, as the computing device attempts to download or open a new file, the traditional computer security system may determine whether that new file includes and/or represents malware. Unfortunately, while this traditional computer security system may be able to accurately classify well known malicious and/or clean files, the traditional computer security system may have difficulty classifying unknown files (e.g., zero-day threats and/or files encountered on only one computer within the computer security system's user base).

To increase the accuracy of such threat classifications, some computer security systems may involve and/or rely on human-driven security decisions. For example, a traditional computer security system may detect an unfamiliar file on a computing device. In this example, rather than attempting to classify the unfamiliar file entirely on its own, the traditional computer security system may turn to a human security analyst for the final decision as to whether the unfamiliar file should be classified as malicious, clean, or unknown. Unfortunately, while the human security analyst may have certain unprogrammable insight into and/or skill for making such security decisions, the traditional computer security system may fail to provide sufficient information about the unfamiliar file to enable the human security analyst to make a truly informed decision on how to classify and/or address the file's threat risk.

The instant disclosure, therefore, identifies and addresses a need for additional and improved systems and methods for curating file clusters for security analyses (especially those involving human-driven security decisions).

SUMMARY

As will be described in greater detail below, the instant disclosure describes various systems and methods for curating file clusters for security analyses by clustering a set of files in connection with a security event and then providing, for presentation to a security analyst, a graphical representation of the file cluster that highlights certain files based at least in part on the contextual value of the files.

In some examples, a computer-implemented method for curating file clusters for security analyses may include (1) identifying a suspicious file that exists on at least one computing system within a computing community, (2) clustering a set of files that includes the suspicious file into a file cluster based at least in part on at least one characteristic shared by the set of files, (3) prioritizing at least one file included in the file cluster based at least in part on a contextual value of the file relative to the file cluster, (4) providing, for presentation to a security analyst, a graphical representation of the file cluster that highlights the prioritized file relative to the file cluster, and then (5) performing at least one security action on the suspicious file based at least in part on feedback received from the security analyst in connection with the graphical representation of the file cluster provided for presentation to the security analyst.

Examples of the security action include, without limitation, classifying the suspicious file or the file cluster as malicious, classifying the suspicious file or the file cluster as non-malicious, directing the computing system within the computing community to quarantine the suspicious file or the file cluster, directing at least one additional computing system within the computing community to quarantine the suspicious file or the file cluster, preventing at least one other computing system within the computing community from accessing the suspicious file or the file cluster, variations of one or more of the same, combinations of one or more of the same, or any other suitable security action.

In one example, the method may also include detecting at least one security event in connection with the suspicious file. In this example, the method may further include determining that the file is suspicious based at least in part on the detected security event.

In one example, the method may also include measuring a degree of similarity among the set of files. In this example, the method may further include determining that the degree of similarity among the set of files is above a similarity threshold. Additionally or alternatively, the method may include clustering the set of files into the file cluster due at least in part to the degree of similarity among the files being above the similarity threshold.

The method may also include calculating the degree of similarity among the set of files based at least in part on various factors. Examples of such factors include, without limitation, whether the set of files co-exist with one another on a certain amount of computing systems within the computing community, whether the set of files are typically created or modified within a certain amount of time of one another on computing systems within the computing community, whether the set of files have filenames whose similarity exceeds a certain threshold, whether the set of files are signed by a common entity, whether the set of files exhibit common behavioral patterns, whether the set of files have at least one library linkage dependency in common, variations of one or more of the same, combinations of one or more of the same, or any other suitable factors.

In one example, the method may also include ranking the file higher than at least one other file included in the file cluster due at least in part to the contextual value of the file. In this example, the method may further include organizing the graphical representation of the file cluster as an ordered list that corresponds to the ranking.

In one example, the method may also include identifying a file type of the file included in the file cluster. In this example, the method may further include determining that the file type of the file is a contextually meaningful file type. Additionally or alternatively, the method may include prioritizing the file included in the file cluster due at least in part to the file type of the file being a contextually meaningful file type (such as an executable .EXE file type or a device driver .SYS file type).

In one example, the method may also include determining that the file has a known reputation. For example, the method may include determining that the file has a good reputation based at least in part on a reputation score assigned to the file being above a certain threshold. In another example, the method may include determining that the file has a bad reputation based at least in part on a reputation score assigned to the file being below a certain threshold. Additionally or alternatively, the method may further include prioritizing the file included in the file cluster due at least in part to the known reputation of the file.

In one example, the method may also include determining that a filename of the file includes natural language that exceeds a certain length. In this example, the method may further include prioritizing the file included in the file cluster due at least in part to the filename of the file including the natural language that exceeds the certain length.

In one example, the method may also include formulating a summary of the file cluster that highlights certain contextually valuable features of the file cluster. Examples of such features include, without limitation, a file included in the file cluster that has a contextually meaningful file type, a file included in the file cluster whose reputation is highest relative to the file cluster, a file included in the file cluster whose reputation is lowest relative to the file cluster, a file included in the file cluster whose filename is most descriptive, variations of one or more of the same, combinations of one or more of the same, or any other suitable contextually valuable features.

Additionally or alternatively, the method may include generating a graphical representation of the file cluster that portrays the summary of the file cluster. The summary of the file cluster may include a histogram that illustrates reputations of the set of files clustered into the file cluster, a histogram that illustrates hygiene levels of computing systems that include the set of files within the computing community, a count of certain file types included in the file cluster, a histogram that illustrates a number of times that the suspicious file has been downloaded from at least one online source, variations of one or more of the same, combinations of one or more of the same, or any other suitable contextually valuable features.

In one example, the method may also include formatting the graphical representation of the file cluster as a collapsible/expandable list. Additionally or alternatively, the method may include determining that the set of files represent portions of a single software package and then clustering the set of files into the file cluster due at least in part to the set of files representing portions of the single software package.

In some examples, a system for implementing the above-described method may include (1) a clustering module, stored in memory, that (A) identifies a suspicious file that exists on at least one computing system within a computing community and (B) clusters a set of files that includes the suspicious file into a file cluster based at least in part on at least one characteristic shared by the set of files, (2) a prioritization module, stored in memory, that prioritizes at least one file included in the file cluster based at least in part on a contextual value of the file relative to the file cluster, (3) a presentation module, stored in memory, that provides, for presentation to a security analyst, a graphical representation of the file cluster that highlights the prioritized file relative to the file cluster, (4) a security module, stored in memory, that performs at least one security action on the suspicious file based at least in part on feedback received from the security analyst in connection with the graphical representation of the file cluster provided for presentation to the security analyst, and (5) at least one physical processor configured to execute the clustering module, the prioritization module, the presentation module, and the security module.

In some examples, the above-described method may be encoded as computer-readable instructions on a non-transitory computer-readable medium. For example, a computer-readable medium may include one or more computer-executable instructions that, when executed by at least one processor of a computing device, causes the computing device to (1) identify a suspicious file that exists on at least one computing system within a computing community, (2) cluster a set of files that includes the suspicious file into a file cluster based at least in part on at least one characteristic shared by the set of files, (3) prioritize at least one file included in the file cluster based at least in part on a contextual value of the file relative to the file cluster, (4) provide, for presentation to a security analyst, a graphical representation of the file cluster that highlights the prioritized file relative to the file cluster, and then (5) perform at least one security action on the suspicious file based at least in part on feedback received from the security analyst in connection with the graphical representation of the file cluster provided for presentation to the security analyst.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
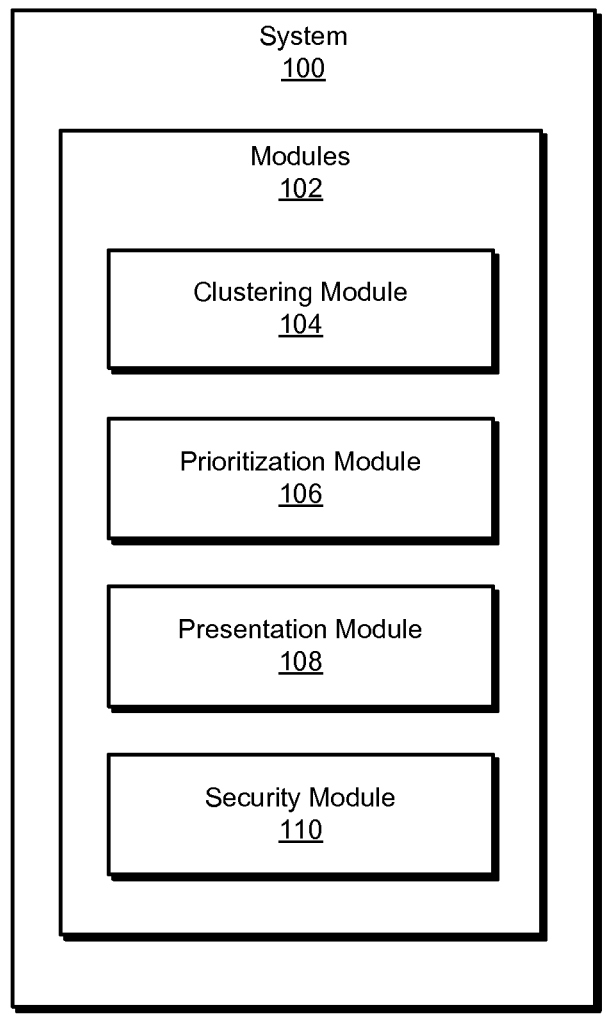
FIG. 1 is a block diagram of an exemplary system for curating file clusters for security analyses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for curating file clusters for security analyses. As will be explained in greater detail below, by curating a file cluster for a security analysis based at least in part on the contextual value of the files included in the file cluster, the systems and methods described herein may summarize the file cluster and/or highlight certain prioritized files and/or features of the file cluster. Moreover, by summarizing the file cluster and/or highlighting certain prioritized files and/or features in this way, the systems and methods described herein may be able to provide a security analyst with sufficient information with which to make an informed decision on how to classify and/or address any security events triggered in connection with a suspicious file included in the file cluster.

Figure 2:
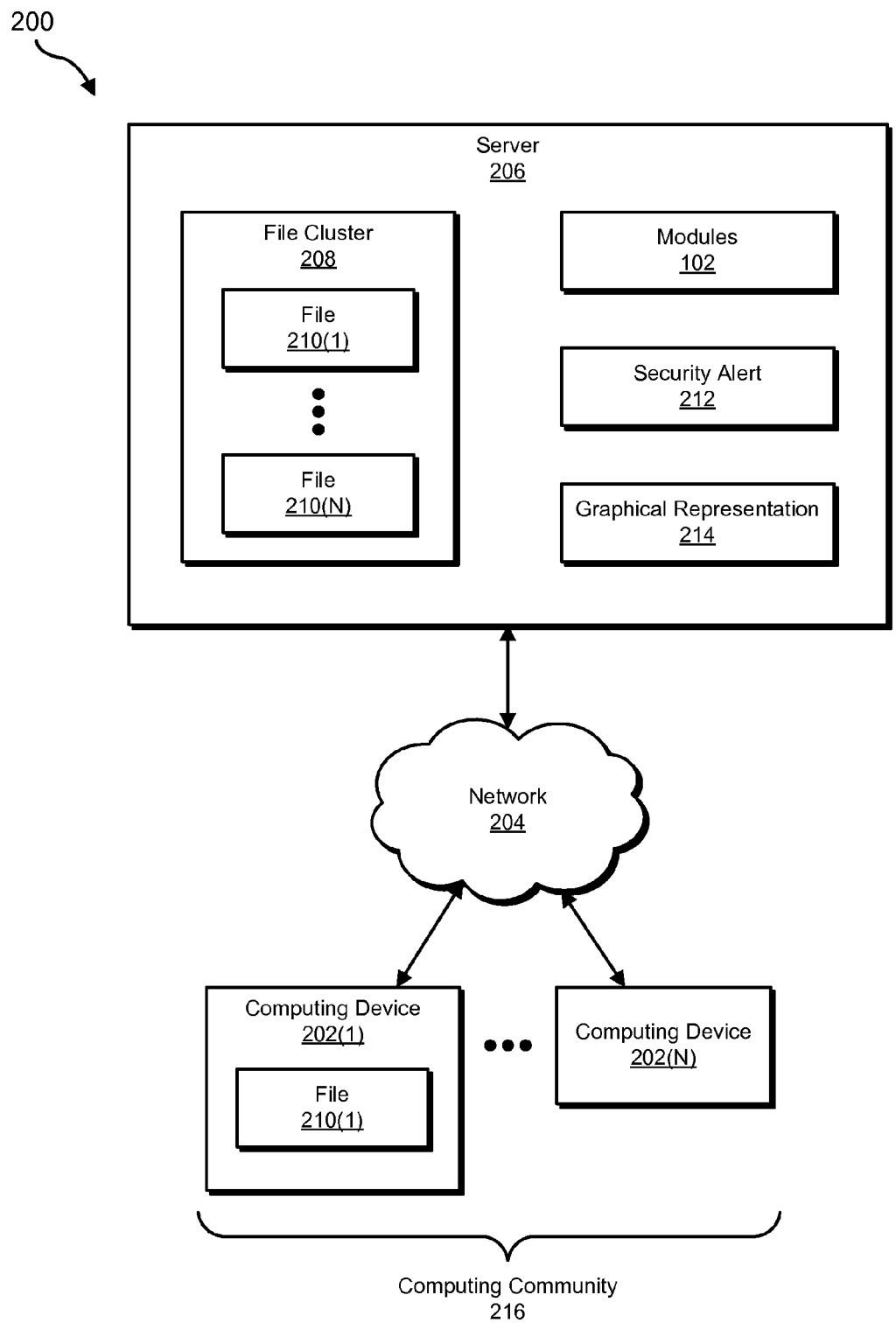
FIG. 2 is a block diagram of an additional exemplary system for curating file clusters for security analyses.

The following will provide, with reference to FIGS. 1 and 2, detailed descriptions of exemplary systems for curating file clusters for security analyses. Detailed descriptions of corresponding computer-implemented methods will be provided in connection with FIG. 3. Detailed descriptions of an exemplary graphical representation of a file cluster will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for curating file clusters for security analyses. As illustrated in this figure, exemplary system 100 may include one or more modules 102 for performing one or more tasks. For example, and as will be explained in greater detail below, exemplary system 100 may include a clustering module 104 that identifies a suspicious file that exists on at least one computing system within a computing community and clusters a set of files that includes the suspicious file into a file cluster based at least in part on at least one characteristic shared by the set of files. Exemplary system 100 may also include prioritization module 106 that prioritizes at least one file included in the file cluster based at least in part on a contextual value of the file relative to the file cluster.

In addition, and as will be described in greater detail below, exemplary system 100 may include a presentation module 108 that provides, for presentation to a security analyst, a graphical representation of the file cluster that highlights the prioritized file relative to the file cluster. Exemplary system 100 may further include a security module 110 that performs at least one security action on the suspicious file based at least in part on feedback received from the security analyst in connection with the graphical representation of the file cluster provided for presentation to the security analyst. Although illustrated as separate elements, one or more of modules 102 in FIG. 1 may represent portions of a single module or application (such as SYMANTEC ENDPOINT SECURITY ADVANCED THREAT PROTECTION (SES-ATP)).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204 that facilitates communication between a server 206 and a computing community 216. In this example, computing community 216 may include and/or represent computing devices 202(1)-(N).

As shown in FIG. 2, server 206 may be programmed with one or more of modules 102. In this example, server 206 may include and/or identify a file cluster 208 that includes files 210(1)-(N). Additionally or alternatively, server 206 may detect and/or raise a security alert 212 in connection with one of files 210(1)-(N).

In one example, server 206 may generate a graphical representation 214 of file cluster 208. In this example, graphical representation 214 may summarize file cluster 208 by highlighting certain prioritized files and/or information based at least in part on their contextual value.

In one example, one or more of computing devices 202(1)-(N) may be programmed with one or more of modules 102 (although not explicitly illustrated as such in FIG. 2). Additionally or alternatively, one or more of computing devices 202(1)-(N) may include, stored, and/or access file 202(1). Moreover, one or more of computing devices 202(1)-(N) may include, stored, and/or access any portion or all of file cluster 208 (although not explicitly illustrated as such in FIG. 2).

In one embodiment, one or more of modules 102 from FIG. 1 may, when executed by at least one processor of computing devices 202(1)-(N) and/or server 206, enable computing devices 202(1)-(N) and/or server 206 to curate file clusters for security analyses. For example, and as will be described in greater detail below, one or more of modules 102 may cause one or more of computing devices 202(1)-(N) and/or server 206 to (1) identify suspicious file 210(1) that exists on computing system 202(1) within computing community 216, (2) cluster files 210(1)-(N) into file cluster 208 based at least in part on at least one characteristic shared by files 210(1)-(N), (3) prioritize at least one file included in file cluster 208 based at least in part on a contextual value of the file relative to file cluster 208, (4) provide, for presentation to a security analyst, graphical representation 214 of file cluster 208 that highlights the prioritized file relative to file cluster 208, and then (5) perform at least one security action on file 210(1) based at least in part on feedback received from the security analyst in connection with graphical representation 214 of file cluster 208 provided for presentation to the security analyst.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing devices.

Computing community 216 generally represents any collection of computing devices that are protected by a common security service and/or provide information to a common security service. In one example, computing community 216 may include computing devices 202(1)-(N). In this example, computing community 216 may include and/or represent a user base of a computer security service and/or product. In other words, computing devices 202(1)-(N) may implement and/or rely on the same computing security service and/or product for protection against security threats. Examples of computing community 216 include, without limitation, a user base of a SYMANTEC security service and/or product, a user base of a MICROSOFT security service and/or product, a user base of a MCAFEE or INTEL security service and/or product, a user base of an ACCELOPS security service and/or product, a user base of a CISCO security service and/or product, variations of one or more of the same, combinations of one or more of the same, or any other suitable computing community.

Server 206 generally represents any type or form of computing device capable of curating file clusters for file analyses. Examples of server 206 include, without limitation, security servers, application servers, web servers, storage servers, and/or database servers configured to run certain software applications and/or provide various security, web, storage, and/or database services. In one example, server 206 may belong to a security service provider and/or vendor responsible for protecting computing community 216 against security threats. Although illustrated as a single device, server 206 may represent a plurality of servers working in conjunction with one another to protect computing community 216 against security threats.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication among computing devices 202(1)-(N) and server 206.

File cluster 208 generally represents any collection of files grouped and/or united together based at least in part on characteristics shared by the files. In one example, file cluster 208 may include and/or represent a set of files whose degree of similarity relative to one another is above a certain threshold. This degree of similarity may depend on certain factors and/or characteristics of the files. Examples of such factors and/or characteristics include, without limitation, whether a set of files co-exist with one another on a certain amount of computing systems within a computing community, whether a set of files represent portions of the same software package, whether a set of files are typically created or modified within a certain amount of time of one another on computing systems within a computing community, whether a set of files have filenames whose similarity exceeds a similarity threshold, whether a set of files are signed by a common entity, whether a set of files exhibit common behavioral patterns, whether a set of files have at least one library linkage dependency in common, variations of one or more of the same, combinations of one or more of the same, or any other suitable factors and/or characteristics.

Security alert 212 generally represents any type or form of alert, warning, and/or block triggered and/or raised in connection with or in response to a security event detected within a computing community. In one example, security alert 212 may have been triggered and/or raised in connection with and/or in response to the detection of file 210(1) within computing community 216. Additionally or alternatively, security alert 212 may represent a single consolidated alert that resulted from the consolidation of various related and/or redundant alerts raised in connection with files 210(1)-(N) and/or file cluster 208.

Graphical representation 214 generally represents any type or form of image, graphic, text, and/or visual display that summarizes, prioritizes, and/or highlights certain features of a file cluster. In one example, graphical representation 214 may include and/or represent a list of notable files included in file cluster 208. In this example, the list may be ranked at least in part on the contextual value of the files relative to file cluster 208. In other words, the list may identify files ranked in order of descending importance and/or meaningfulness to a security analyst responsible for deciding whether to classify any portion or all of file cluster 208 as potentially malicious. Graphical representation 214 may include, represent, and/or identify various information about file cluster 208. Examples of such information include, without limitation, a file included in the file cluster that has a contextually meaningful file type, a file included in the file cluster whose reputation is highest relative to the file cluster, a file included in the file cluster whose reputation is lowest relative to the file cluster, a file included in the file cluster whose filename is most descriptive, a histogram that illustrates reputations of the set of files clustered into the file cluster, a histogram that illustrates hygiene levels of computing systems that include the set of files within the computing community, a count of certain file types included in the file cluster, a histogram that illustrates a number of times that the suspicious file has been downloaded from at least one online source, variations of one or more of the same, combinations of one or more of the same, or any other suitable information about a file cluster.

Figure 3:
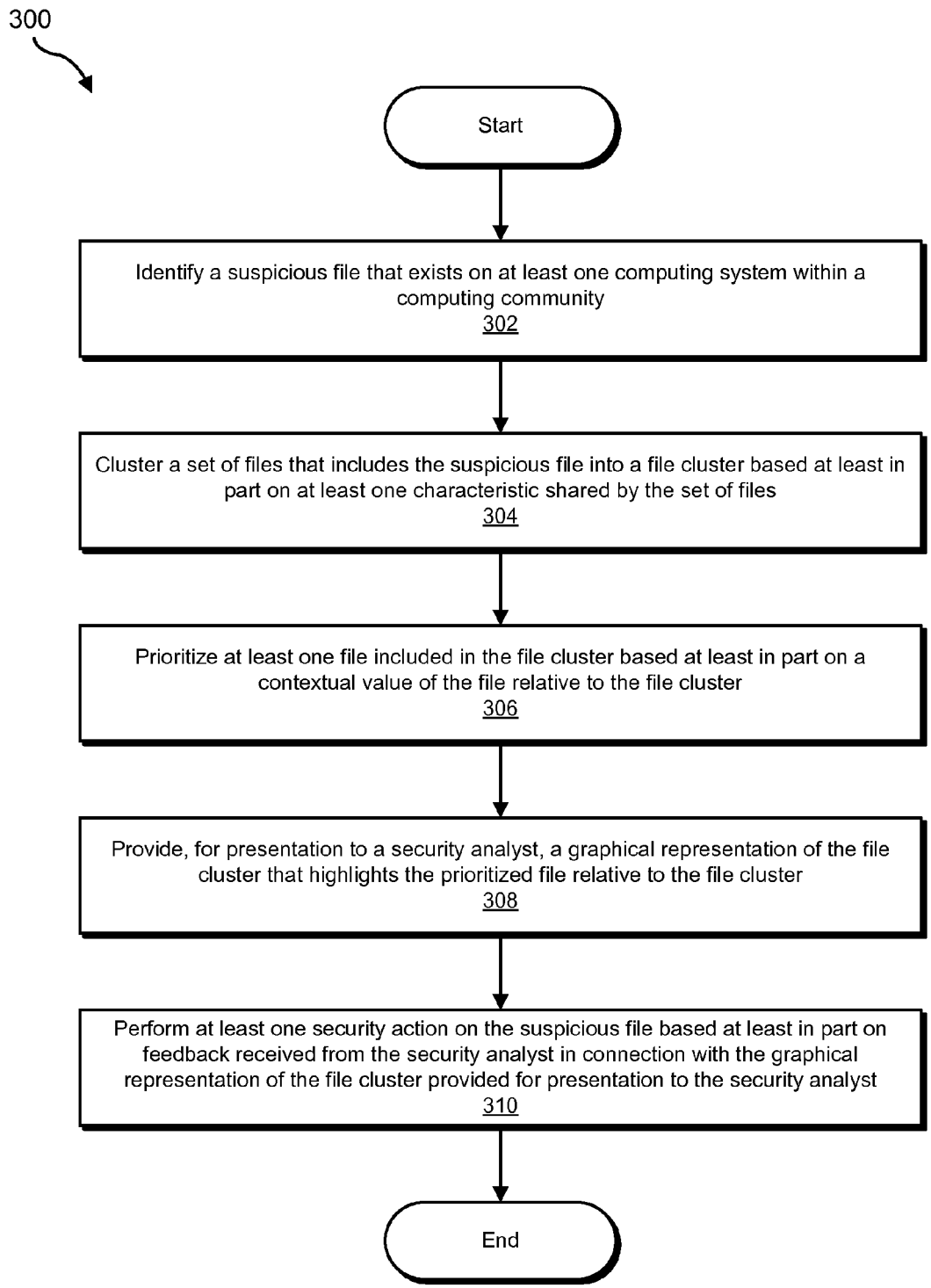
FIG. 3 is a flow diagram of an exemplary method for curating file clusters for security analyses.

FIG. 3 is a flow diagram of an exemplary computer-implemented method 300 for curating file clusters for security analyses. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a suspicious file that exists on at least one computing system within a computing community. For example, clustering module 104 may, as part of server 206 and/or one or more of computing devices 202(1)-(N) in FIG. 2, identify file 210(1) on computing device 202(1) within computing community 216. Clustering module 104 may then determine that file 210(1) is suspicious in one way or another. Although file 210(1) is shown only on computing device 202(1) within computing community 216 in FIG. 2, file 210(1) may additionally or alternatively exist on various other computing devices within computing community 216.

Various characteristics and/or features of file 210(1) may lead clustering module 104 to the determination that file 210(1) is suspicious. For example, file 210(1) may trigger and/or cause a security event (such as security alert 212). As another example, file 210(1) may be unfamiliar, unrecognizable, and/or new to a computer security system that monitors computing community 216. Additionally or alternatively, file 210(1) may have yet to be assigned a reputation score that indicates the reputation of file 210(1). Moreover, file 210(1) may exist on only one of computing devices 202(1)-(N) within computing community 216.

The systems described herein may perform step 302 in a variety of ways and/or contexts. In some examples, clustering module 104 may monitor computing devices 202(1)-(N) within computing community 216 for potential security threats. While monitoring computing devices 202(1)-(N) in this way, clustering module 104 may detect a download of file 210(1) by computing device 202(1). Clustering module 104 may then collect certain information about file 210(1) from computing device 202(1) and/or any network devices within network 204 that facilitated the download of file 210(1). Clustering module 104 may determine that file 210(1) is suspicious based at least in part on such information about file 210(1).

In some examples, clustering module 104 may detect at least one security event in connection with file 210(1). In one example, clustering module 104 may receive security alert 212 from a security agent running on computing device 202(1). For example, computing device 202(1) may download file 210(1) from the Internet. In response to this download of file 210(1), the security agent running on computing device 202(1) may raise security alert 212. The security agent may then notify clustering module 104 of security alert 212 and/or send security alert 212 to clustering module 104. Additionally or alternatively, clustering module 104 may determine that file 210(1) is suspicious based at least in part on security alert 212.

Returning to FIG. 3, at step 304 one or more of the systems described herein may cluster a set of files that includes the suspicious file into a file cluster based at least in part on at least one characteristic shared by the set of files. For example, clustering module 104 may, as part of server 206 and/or one or more of computing devices 202(1)-(N) in FIG. 2, cluster files 210(1)-(N) into file cluster 208 based at least in part on at least one characteristic shared by files 210(1)-(N). Although all of files 210(1)-(N) are shown only on server 206 in FIG. 2, all of files 210(1)-(N) may additionally or alternatively exist on one or more computing devices within computing community 216.

The systems described herein may perform step 304 in a variety of ways and/or contexts. In some examples, clustering module 104 may cluster files 210(1)-(N) into file cluster 208 due at least in part to the degree of similarity among files 210(1)-(N). In one example, clustering module 104 may measure the degree of similarity among files 210(1)-(N). For example, clustering module 104 may calculate the degree of similarity among files 210(1)-(N) based at least in part on certain factors and/or characteristics of files 210(1)-(N). This degree of similarity may be calculated using any type or form of algorithm and/or formula.

Upon measuring the degree of similarity among files 210(1)-(N), clustering module 104 may determine that the degree of similarity among files 210(1)-(N) is above a similarity threshold. The term "similarity threshold," as used herein, generally refers to any type or form of number, percentage, and/or metric used as a reference point for determining whether the degree of similarity among a set of files warrants clustering those files into a file cluster. Clustering module 104 may then cluster files 210(1)-(N) into file cluster 208 due at least in part to the degree of similarity among files 210(1)-(N) being above the similarity threshold.

In one example, clustering module 104 may cluster files 210(1)-(N) into file cluster 208 based at least in part on files 210(1)-(N) representing portions of a single software package. For example, clustering module 104 may examine and/or analyze certain characteristics of files 210(1)-(N) (including any of those described above in connection with calculating the degree of similarity). In this example, clustering module 104 may determine that files 210(1)-(N) represent portions of the same software package based at least in part on this examination and/or analysis. In other words, clustering module 104 may determine that files 210(1)-(N) belong to, originate from, and/or were spawned by the same software package. Clustering module 104 may then cluster files 210(1)-(N) into file cluster 208 due at least in part to files 210(1)-(N) representing portions of the same software package.

Returning to FIG. 3, at step 306 one or more of the systems described herein may prioritize at least one file included in the file cluster based at least in part on a contextual value of the file relative to the file cluster. For example, prioritization module 106 may, as part of server 206 and/or one or more of computing devices 202(1)-(N) in FIG. 2, prioritize file 210(N) included in file cluster 208 based at least in part on a contextual value of file 210(N) relative to file cluster 208. The term "contextual value," as used herein in connection with a file, generally refers to the importance, significance, and/or advantage that information about the file may provide to a security analyst responsible for making a decision on how to classify and/or remediate a file cluster that includes the file and/or another file with which the file is clustered.

The systems described herein may perform step 306 in a variety of ways and/or contexts. In some examples, prioritization module 106 may prioritize files 210(1)-(N) included in file cluster 208 based at least in part on a set of rules. For example, a set of rules may dictate that prioritization module 106 prioritize files included in file clusters based at least in part on (1) the contextual value of the file types of the files, (2) the reputation scores assigned to the files, and/or (3) whether the filenames of the files include natural language that exceeds a certain length. In this example, prioritization module 106 may prioritize file 210(N) over one or more other files included in file cluster 208 in accordance with this set of rules.

In one example, prioritization module 106 may prioritize file 210(N) by ranking file 210(N) higher than other less contextually valuable files included in file cluster 208. For example, prioritization module 106 may identify a file type of file 210(N). In this example, prioritization module 106 may determine that the file type of file 210(N) is contextually meaningful. Prioritization module 106 may then prioritize file 210(1) by ranking file 210(1) higher than one or more other files included in file cluster 208 due at least in part to the file type of file 210(1) being more contextually meaningful than the file type(s) of the other files.

The term "contextually meaningful," as used herein in connection with a file type, generally refers to the importance, significance, and/or advantage that information about a file of that file type may provide to a security analyst responsible for making a decision on how to classify and/or address a file cluster that includes the file of that file type and/or another file with which the file of that file type is clustered. Examples of contextually meaningful file types include, without limitation, executable .EXE file types, device driver .SYS file types, variations of one or more of the same, combinations of one or more of the same, or any other contextually meaningful file types.

As a specific example, a set of rules may dictate that executable .EXE files be prioritized above device driver .SYS files. This set of rules may further dictate that device driver .SYS files be prioritized above dynamic-link library .DLL files. In this example, prioritization module 106 may determine that file 210(N) is an executable .EXE file, file 210(2) (not explicitly illustrated in FIG. 2) is a device driver .SYS file, and/or file 210(3) (not explicitly illustrated in FIG. 2) is a dynamic-link library .DLL file. Prioritization module 106 may then prioritize file 210(N) over files 210(2)-(3) and file 210(2) over file 210(3) in accordance with this set of rules.

In some examples, prioritization module 106 may prioritize file 210(N) based at least in part on the known reputation of file 210(N). For example, prioritization module 106 may determine that file 210(N) has a known reputation (as opposed to having no known reputation and/or no known reputation score). In one example, prioritization module 106 may determine that file 210(N) has a good reputation since the reputation score assigned to file 210(N) is above a certain threshold. In another example, prioritization module 106 may determine that file 210(N) has a bad reputation since the reputation score assigned to file 210(N) is below a certain threshold.

Either way, a file that has a known good or bad reputation may be considered more contextually valuable and/or meaningful to a security analyst than a file that has no known reputation or a reputation score that corresponds to neither a good reputation nor a bad reputation. As a result, prioritization module 106 may prioritize file 210(N) over one or more other files included in file cluster 208 due at least in part to the known reputation (whether good or bad) of file 210(N).

As a specific example, a set of rules may dictate that files with bad reputations be prioritized above files with good reputations. This set of rules may further dictate that good reputations be prioritized above files with unknown reputations and/or low-confidence reputations. In this example, prioritization module 106 may determine that file 210(N) has a very bad reputation, file 210(2) (not explicitly illustrated in FIG. 2) has a fairly good reputation, and/or file 210(3) (not explicitly illustrated in FIG. 2) has an unknown reputation or a low-confidence reputation. Prioritization module 106 may then prioritize file 210(N) over files 210(2)-(3) and file 210(2) over file 210(3) in accordance with this set of rules.

In some examples, prioritization module 106 may prioritize file 210(N) based at least in part on the filename, file path, and/or directory of file 210(N). For example, prioritization module 106 may determine that file 210(N) has a filename, file path, and/or directory that includes natural language. In this example, prioritization module 106 may determine that the natural language exceeds a certain length (e.g., a certain number of characters in the natural language) and/or level of descriptiveness. Prioritization module 106 may then prioritize file 210(N) over one or more other files included in file cluster 208 due at least in part to the length and/or descriptiveness of the natural language included in the filename, file path, and/or directory of file 210(N). The term "natural language," as used herein, generally refers to any type or form of character string that includes and/or represents human-spoken and/or human-written language and/or wording.

As a specific example, a set of rules may dictate that files with filenames that include natural language of a certain length and/or descriptiveness be prioritized above files without such filenames. For example, prioritization module 106 may determine that file 210(N) has a very descriptive filename that explicitly spells out the name of a software package and file 210(2) has a filename that does not include any intelligible natural language. In this example, file 210(N) may belong to, originate from, and/or were spawned by the software package whose name is spelled out in the filename. Prioritization module 106 may then prioritize file 210(N) over files 210(2) in accordance with this set of rules.

Returning to FIG. 3, at step 308 one or more of the systems described herein may provide, for presentation to a security analyst, a graphical representation of the file cluster that highlights the prioritized file relative to the file cluster. For example, presentation module 108 may, as part of server 206 and/or one or more of computing devices 202(1)-(N) in FIG. 2, provide graphical representation 214 of file cluster 208 for presentation to a human security analyst. In this example, the security analyst may be an employee and/or representative of a security service provider and/or vendor responsible for protecting computing community 216 against potential security threats. Additionally or alternatively, the security analyst may be tasked with making the final decision on how to classify and/or address file 210(1) and/or file cluster 208.

The systems described herein may perform step 308 in a variety of ways and/or contexts. In some examples, presentation module 108 may provide graphical representation 214 of file cluster 208 to the security analyst via a monitor and/or display connected to or associated with server 206. For example, the security analyst may be operating server 206. In this example, presentation module 108 may direct the monitor and/or display to present graphical presentation 214 of file cluster 208. By directing the monitor and/or display to present graphical presentation 214 in this way, presentation module 108 may ensure that the security analyst is able to view and/or review graphical representation 214 to determine how to classify and/or address file 210(1) and/or file cluster 208.

In one example, presentation module 108 may provide graphical representation 214 of file cluster 208 to the security analyst via a separate computing device (not necessarily illustrated in FIG. 2) operated by and/or in possession of the security analyst. For example, the security analyst may carry and/or operate a mobile device. In this example, presentation module 108 may send graphical representation 214 of file cluster 208 to the mobile device carried and/or operated by the security analyst. Additionally or alternatively, presentation module 108 may direct the mobile device to present graphical representation 214 of file cluster 208 to the security analyst via a display and/or monitor connected to and/or integrated in the mobile device. By directing the monitor and/or display to present graphical presentation 214 in this way, presentation module 108 may ensure that the security analyst is able to view and/or review graphical representation 214 to determine how to classify and/or address file 210(1) and/or file cluster 208.

In one example, presentation module 108 may generate graphical representation 214 to reflect and/or correspond to the prioritization of file cluster 208. For example, presentation module 108 may create and/or formulate a summary of file cluster 208 that highlights certain contextually valuable and/or meaningful features of file cluster 208. Examples of such features include, without limitation, a file that has a contextually meaningful file type, a file with the highest reputation in the file cluster, a file with the lowest reputation in the file cluster, a file with the most descriptive filename in the file cluster, variations of one or more of the same, combinations of one or more of the same, or any other suitable contextually valuable features. Presentation module 108 may generate graphical representation 214 such that graphical representation 214 portrays the summary that highlights those features of file cluster 208.

In some examples, presentation module 108 may organize graphical representation 214 of file cluster 208 in accordance with a set of rules that dictate the prioritization of files included in file clusters. For example, presentation module 108 may organize graphical representation 214 of file cluster 208 as an ordered and/or ranked list that corresponds to the prioritization and/or ranking of files 210(1)-(N) relative to file cluster 208. In this example, the ordered and/or ranked list may show and/or present a representation of at least some of files 210(1)-(N) in order of importance, significance, value, and/or meaningfulness from the perspective of the security analyst.

In some examples, presentation module 108 may format at least a portion of graphical representation 214 of file cluster 208 as a collapsible and/or expandable list. For example, presentation module 108 may configure and/or design graphical representation 214 to show and/or display only the summary of file cluster 208 when a collapsible/expandable portion of graphical representation 214 is collapsed. However, when the collapsible/expandable portion of graphical representation 214 is expanded, graphical representation 214 may show and/or display certain individual files (e.g., contextually meaningful files) included in file cluster 208.

In some examples, presentation module 108 may consolidate and/or combine certain security alerts triggered in connection with files 210(1)-(N) into a single security alert. For example, clustering module 104 may detect various security events that triggered and/or resulted in various security alerts in connection with files 210(1)-(N). To reduce redundancy and/or maximize the efficiency of graphical representation 214, presentation module 108 may consolidate and/or combine those security alerts into security alert 212 rather than incorporating and/or illustrating all of those security alerts in graphical representation 214.

Figure 4:
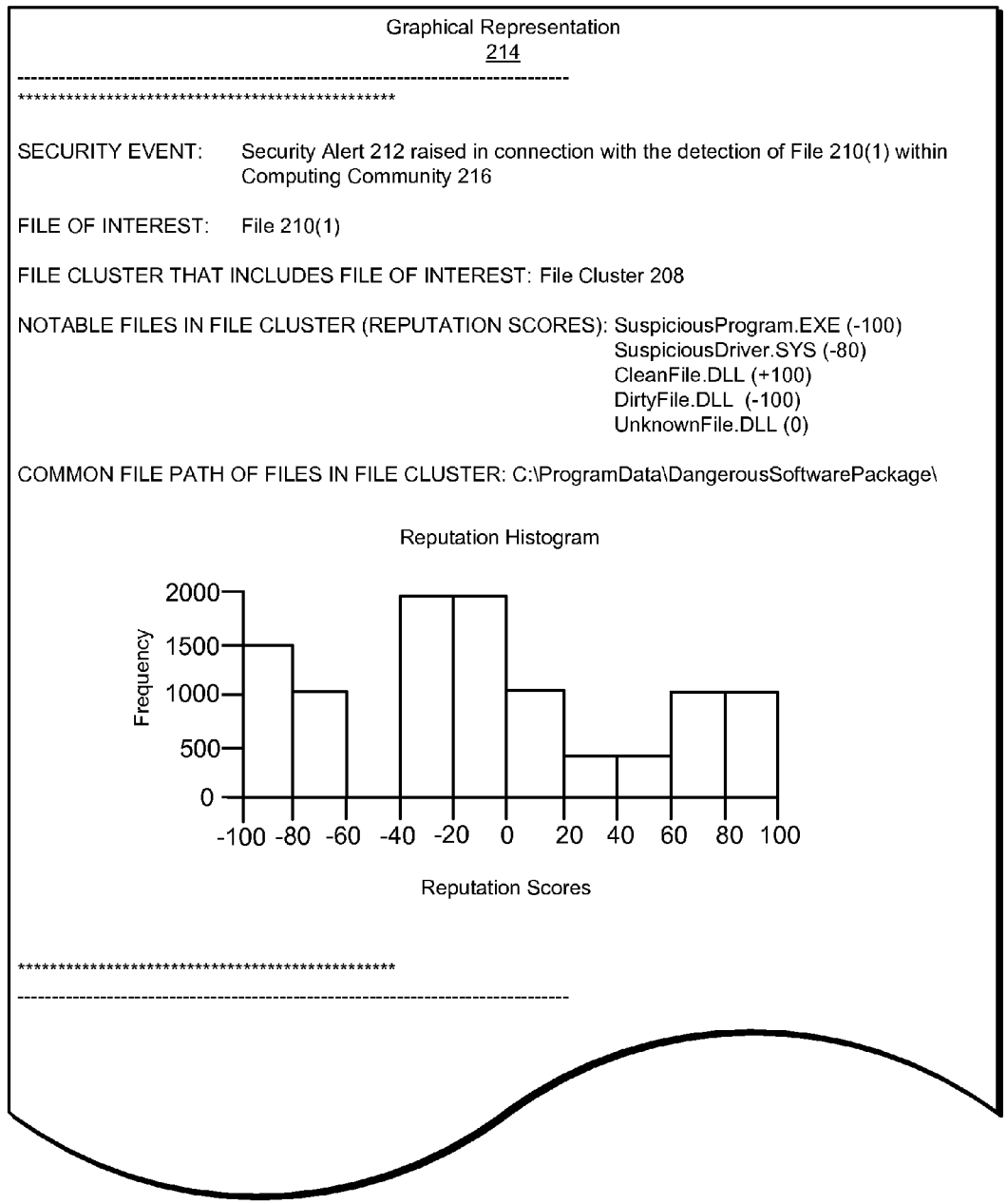
FIG. 4 is an illustration of an exemplary graphical representation that highlights certain files prioritized relative to a file cluster.

As a specific example, presentation module 108 may generate graphical representation 214 in FIG. 4 and then provide the same for presentation to the security analyst. As illustrated in FIG. 4, graphical representation 214 may include and/or identify a security event detected in connection with a file of interest (in this example, "Security Alert 212 raised in connection with the detection of File 210(1) within Computing Community 216"), the file of interest itself (in this example, "File 210(1)"), a file cluster that includes the file of interest (in this example, "File Cluster 208"), certain notable files included in the file cluster along with the reputation scores of those notable files (in this example, "SuspiciousProgram.EXE (−100)," "SuspiciousDriver.SYS (−80)," "CleanFile.DLL (+100)," "DirtyFile.DLL (−100)," and "UnknownFile.DLL (0)"), a file path that is common to many, if not all, of the files included in the file cluster (in this example, "C:\ProgramData\DangerousSoftarePackage\"), and a reputation histogram that illustrates the frequency of different reputation scores assigned to files included in the file cluster. Graphical representation 214 may also include and/or identify various other features of file cluster 208 that are not explicitly illustrated in FIG. 4.

Returning to FIG. 3, at step 310 one or more of the systems described herein may perform at least one security action on the suspicious file based at least in part on feedback received from the security analyst in connection with the graphical representation of the file cluster provided for presentation to the security analyst. For example, security module 110 may, as part of server 206 and/or one or more of computing devices 202(1)-(N) in FIG. 2, perform a least one security action on file 210(1) based at least in part on feedback received from the security analyst in connection with graphical representation 214 of file cluster 208.

Examples of such a security action include, without limitation, classifying the suspicious file or the file cluster as malicious, classifying the suspicious file or the file cluster as non-malicious, directing the computing system within the computing community to quarantine the suspicious file or the file cluster, directing at least one additional computing system within the computing community to quarantine the suspicious file or the file cluster, preventing at least one other computing system within the computing community from accessing the suspicious file or the file cluster, variations of one or more of the same, combinations of one or more of the same, or any other suitable security action.

The systems described herein may perform step 310 in a variety of ways and/or contexts. In one example, security module 110 may perform the security action on all of file cluster 208 in response to the feedback received from the security analyst. For example, security module 110 may receive feedback from the security analyst that indicates file 210(1) is likely malicious. Additionally or alternatively, security module 110 may receive feedback from the security analyst that instructs security module 110 to classify all of file cluster 208 as malicious. In either case, security module 110 may classify all of file cluster 208 as malicious based at least in part on the feedback received from the security analyst (regardless of whether the feedback is directed to file 210(1) alone or all of file cluster 208).

In another example, security module 110 may perform the security action only on the suspicious file and/or the file of interest in response to the feedback received from the security analyst. For example, security module 110 may receive feedback from the security analyst that indicates file 210(1) is likely malicious. Additionally or alternatively, security module 110 may receive feedback from the security analyst that instructs security module 110 to classify file 210(1) as malicious. In either case, security module 110 may classify file 210(1) as malicious (without necessarily classifying the rest of file cluster 208) based at least in part on the feedback received from the security analyst.

In some examples, the systems and methods described herein may prioritize and/or rank certain file clusters over other file clusters. In one example, prioritization module 106 may prioritize and/or rank file cluster 208 over at least one other cluster (not illustrated in FIG. 2) based at least in part on a set of rules. For example, a set of rules may dictate that prioritization module 106 prioritize and/or rank clusters based at least in part on (1) the average suspicion and/or reputation score of the individual files included in the clusters, (2) the minimum suspicion and/or reputation score of any individual file included in the clusters, (3) the average importance of the computing devices that have encountered any files included in the clusters (or on which such files exist), and/or (4) the most important computing device that has encountered any files included in the clusters (or on which such files exist).

In this example, prioritization module 106 may calculate an overall suspicion score for the clusters using any type or form of algorithm and/or formula. For example, prioritization module 106 may calculate overall suspicion scores for both file cluster 208 and the other cluster by applying the above factors to an algorithm and/or formula. In this example, the resulting suspicion score for file cluster 208 may be higher and/or greater than the resulting suspicion score for the other file cluster, thereby indicating and/or suggesting that file cluster 208 is more suspicious than the other file cluster. As a result, prioritization module 106 may prioritize and/or rank file cluster 208 over the other file cluster.

Since, in this example, prioritization module 106 has prioritized and/or ranked file cluster 208 over the other file cluster, presentation module 106 may provide graphical representation 214 of file cluster 208 for presentation to the security analyst prior to providing a graphical representation of the other file cluster to the security analyst. In another example, presentation module 106 may provide graphical representation 214 of file cluster 208 above and/or before a graphical representation of the other file cluster in a display presented to the security analyst.

Additionally or alternatively, presentation module 106 may generate graphical representation 214 such that graphical representation 214 identifies and/or portrays the overall suspicion score of file cluster 208. Similarly, presentation module 106 may generate the graphical representation of the other file cluster such that the graphical representation identifies and/or portrays the overall suspicion score of the other file cluster.

As explained above in connection with FIGS. 1-4, a computer security system may turn to and/or rely at least in part on a human security analyst to make a final decision on how to classify and/or address certain new, unfamiliar, and/or questionable files encountered within a computing community. In one example, the security analyst's ability to successfully classify and/or address a security event and/or file may depend at least in part on the information and/or context surrounding the security event and/or file. To place and/or frame the security event and/or file in the most meaningful context for classification purposes, the computer security system may collect additional information and/or context about the security event and/or file.

This additional information and/or context may include and/or identify whether the file co-exists with other files on a certain amount of computing systems within a computing community, whether the file and the other files are typically created or modified within a certain amount of time of one another on the computing systems within the computing community, whether the file and the other files have similar but unusual filenames, whether the file and the other files are signed by a common entity, whether the file and the other files exhibit common behavioral patterns, whether the file and the other files have at least one library linkage dependency in common, and/or whether the file and the other files represents portions of the same software package.

Upon collecting this additional information and/or context, the computer security system may generate a graphical representation of the security event and/or file in view of this additional information and/or context. In one example, the graphical representation of the security event and/or file may be organized and/or prioritized based on a set of rules intended to maximize the contextual value presented to the security analyst. This set of rules may call for the graphical representation to (1) prioritize .EXE and .SYS files over .DLL files, (2) bias files with either very good or very bad reputations above files whose reputation is uncertain, and (3) highlight files with long descriptive filenames in natural language over short non-descriptive filenames in non-natural language.

As a specific example, a graphical representation of the security event and/or file may display up to 10 closely related files ranked by the above rules. The graphical representation may also include a summary of various high-level statistics about the security event, file, and/or additional information or context. For example, the graphical representation may illustrate (1) a histogram of reputation scores assigned to various files related to the file of interest, (2) a histogram of machine hygiene scores assigned to the computing devices that have encountered any or all of those files, (3) a count of all the different file types of those files, and/or (4) a histogram of the number of files downloaded from each of the top Uniform Resource Locators (URLs) that host the file of interest.

The computer security system may also consolidate and/or group together file-related security alerts to avoid and/or reduce redundancy. In one example, various closely related security alerts may be grouped together as a list at the top of the graphical representation. The computer security system may then present the graphical representation to the security analyst so that the security analyst is able to make a final decision on how to classify and/or address the file and/or the other related files. Additionally or alternatively, the computer security system may perform any appropriate remediation on the file and/or the other related files in connection with the final decision made by the security analyst.

Figure 5:
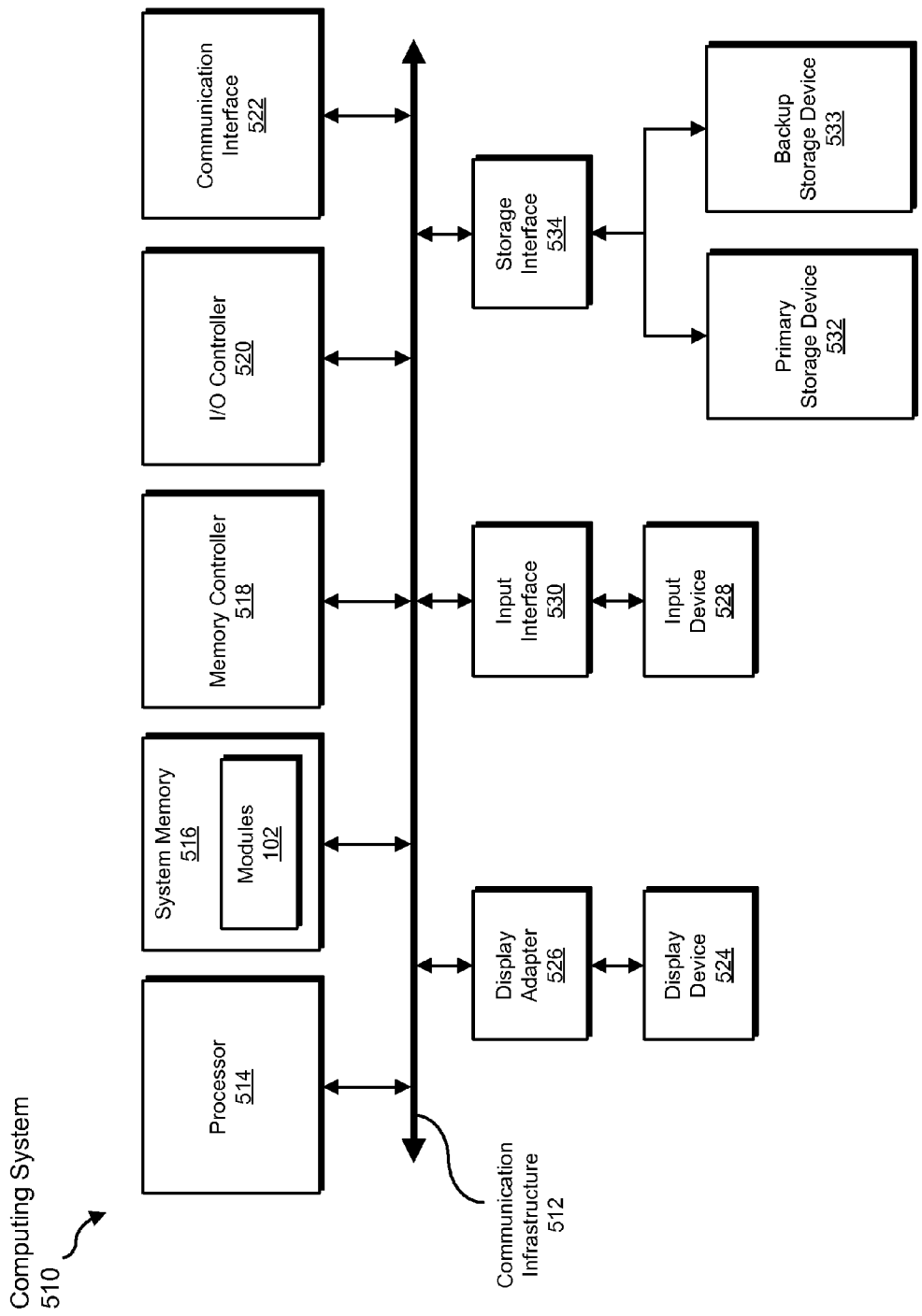
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
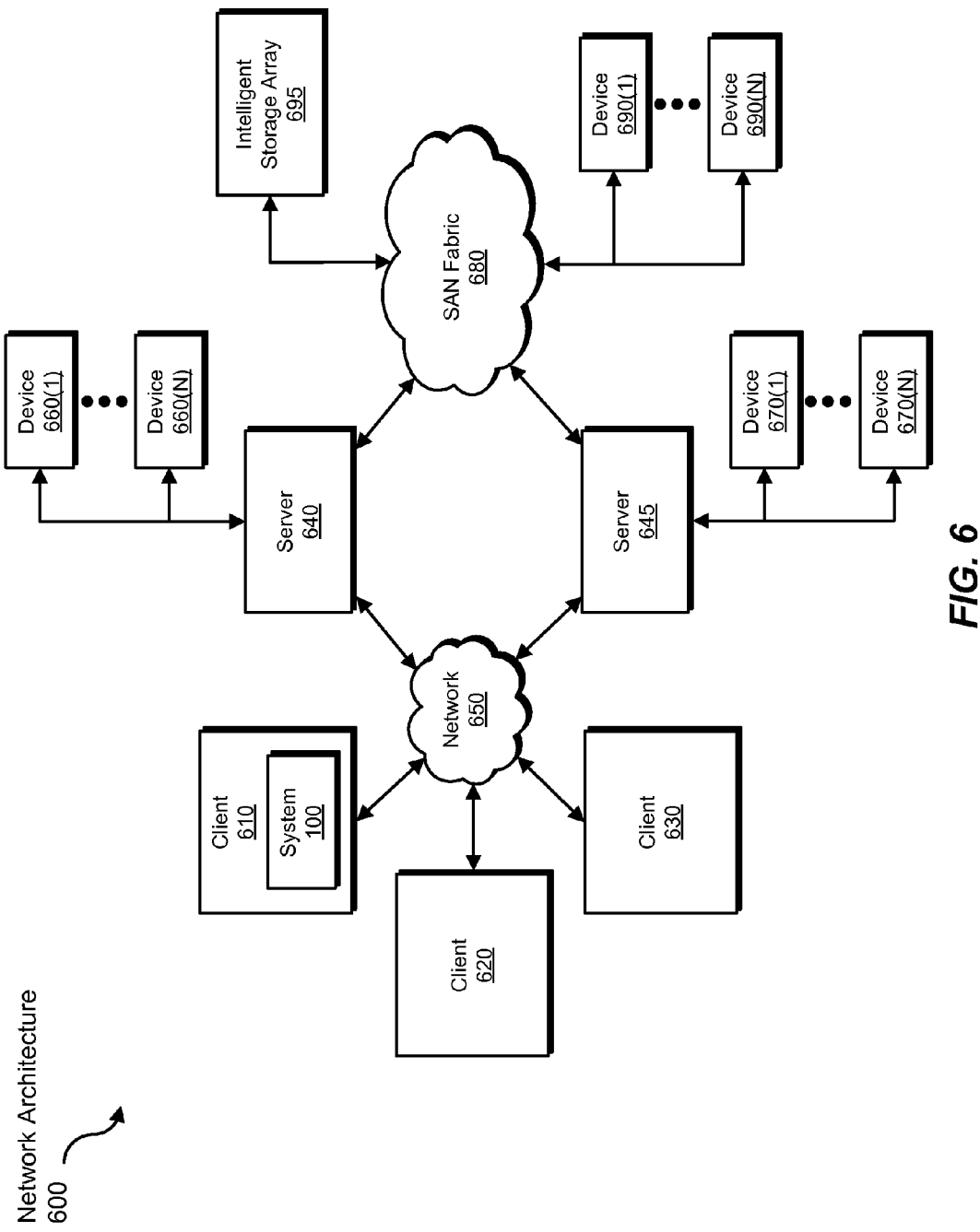
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for curating file clusters for security analyses.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data about files to be transformed into a file cluster, transform the data into the file cluster, output a result of the transformation to a graphical representation of the file cluster, use the result of the transformation to determine whether the files constitute and/or include malware, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for curating file clusters for security analyses, at least a portion of the method being performed by a computing device comprising at least one processor, the method comprising:

identifying a suspicious file that exists on at least one computing system within a computing community;

clustering a set of files that includes the suspicious file into a file cluster based at least in part on at least one characteristic shared by the set of files, wherein clustering the set of files comprises:

measuring a degree of similarity among the set of files;

determining that the degree of similarity among the set of files is above a similarity threshold; and clustering the set of files into the file cluster due at least in part to the degree of similarity among the files being above the similarity threshold;

prioritizing at least one file included in the file cluster based at least in part on a contextual value of the file relative to the file cluster by ranking the file higher than at least one other file included in the file cluster due at least in part to the contextual value of the file;

providing, for presentation to a security analyst, a graphical representation of the file cluster that:

highlights the prioritized file relative to the file cluster; and is organized as an ordered list that corresponds to the ranking;

receiving feedback from the security analyst in connection with the graphical representation of the file cluster provided for presentation to the security analyst; and performing at least one security action on the suspicious file based at least in part on feedback received from the security analyst in connection with the graphical representation of the file cluster provided for presentation to the security analyst.

2. The method of claim 1, wherein identifying the suspicious file comprises:

detecting at least one security event in connection with the suspicious file; and determining that the file is suspicious based at least in part on the detected security event.

3. The method of claim 1, wherein measuring the degree of similarity among the set of files comprises calculating the degree of similarity among the set of files based at least in part on at least one of:

whether the set of files co-exist with one another on a certain amount of computing systems within the computing community;

whether the set of files are typically created or modified within a certain amount of time of one another on computing systems within the computing community;

whether the set of files have filenames whose similarity exceeds a certain threshold;

whether the set of files are signed by a common entity;

whether the set of files exhibit common behavioral patterns; and whether the set of files have at least one library linkage dependency in common.

4. The method of claim 1, wherein providing the graphical representation of the file cluster for presentation to the security analyst comprises organizing the graphical representation of the file cluster as an ordered list that corresponds to the ranking.

5. The method of claim 1, wherein providing the graphical representation of the file cluster for presentation to the security analyst comprises:

formulating a summary of the file cluster that highlights at least one of:

a file included in the file cluster that has a contextually meaningful file type;

a file included in the file cluster whose reputation is highest relative to the file cluster;

a file included in the file cluster whose reputation is lowest relative to the file cluster; and a file included in the file cluster whose filename is most descriptive; and generating a graphical representation of the file cluster that portrays the summary of the file cluster.

6. The method of claim 5, wherein the summary of the file cluster comprises at least one of:

a histogram that illustrates reputations of the set of files clustered into the file cluster;

a histogram that illustrates hygiene levels of computing systems that include the set of files within the computing community;

a count of certain file types included in the file cluster; and a histogram that illustrates a number of times that the suspicious file has been downloaded from at least one online source.

7. The method of claim 1, wherein providing the graphical representation of the file cluster for presentation to the security analyst comprises formatting the graphical representation of the file cluster as a collapsible/expandable list.

8. The method of claim 1, wherein clustering the set of files into the file cluster comprises:

determining that the set of files represent portions of a single software package; and clustering the set of files into the file cluster due at least in part to the set of files representing portions of the single software package.

9. The method of claim 1, wherein the security action comprises at least one of:

classifying the suspicious file or the file cluster as malicious;

classifying the suspicious file or the file cluster as non-malicious;

directing the computing system within the computing community to quarantine the suspicious file or the file cluster;

directing at least one additional computing system within the computing community to quarantine the suspicious file or the file cluster; and preventing at least one other computing system within the computing community from accessing the suspicious file or the file cluster.

10. A system for curating file clusters for security analyses, the system comprising:

a clustering module, stored in memory, that:

identifies a suspicious file that exists on at least one computing system within a computing community; and clusters a set of files that includes the suspicious file into a file cluster based at least in part on at least one characteristic shared by the set of files, wherein the clustering module clusters the set of files by:

measuring a degree of similarity among the set of files;

determining that the degree of similarity among the set of files is above a similarity threshold; and determining that the degree of similarity among the set of files is above a similarity threshold; and clustering the set of files into the file cluster due at least in part to the degree of similarity among the files being above the similarity threshold;

a prioritization module, stored in memory, that prioritizes at least one file included in the file cluster based at least in part on a contextual value of the file relative to the file cluster by ranking the file higher than at least one other file included in the file cluster due at least in part to the contextual value of the file;
a presentation module, stored in memory, that provides, for presentation to a security analyst, a graphical representation of the file cluster that:
   highlights the prioritized file relative to the file cluster; and
   is organized as an ordered list that corresponds to the ranking;
a security module, stored in memory, that:
   receives feedback from the security analyst in connection with the graphical representation of the file cluster provided for presentation to the security analyst; and
   performs at least one security action on the suspicious file based at least in part on feedback received from the security analyst in connection with the graphical representation of the file cluster provided for presentation to the security analyst; and
at least one physical processor configured to execute the clustering module, the prioritization module, the presentation module, and the security module.

11. The system of claim 10, wherein the clustering module identifies the suspicious file by:
   detecting at least one security event in connection with the suspicious file; and
   determining that the file is suspicious based at least in part on the detected security event.

12. A non-transitory computer-readable medium comprising one or more computer-executable instructions that, when executed by at least one processor of a computing device, cause the computing device to:
   identify a suspicious file that exists on at least one computing system within a computing community;
   cluster a set of files that includes the suspicious file into a file cluster based at least in part on at least one characteristic shared by the set of files, wherein clustering the set of files comprises:
      measuring a degree of similarity among the set of files;
      determining that the degree of similarity among the set of files is above a similarity threshold; and
      clustering the set of files into the file cluster due at least in part to the degree of similarity among the files being above the similarity threshold;
   prioritize at least one file included in the file cluster based at least in part on a contextual value of the file relative to the file cluster by ranking the file higher than at least one other file included in the file cluster due at least in part to the contextual value of the file;
   provide, for presentation to a security analyst, a graphical representation of the file cluster that:
      highlights the prioritized file relative to the file cluster; and
      is organized as an ordered list that corresponds to the ranking;
   receive feedback from the security analyst in connection with the graphical representation of the file cluster provided for presentation to the security analyst; and
   perform at least one security action on the suspicious file based at least in part on feedback received from the security analyst in connection with the graphical representation of the file cluster provided for presentation to the security analyst.

* * * * *